Sept. 9, 1930.    H. H. WHITE    1,775,611
POWER DELIVERING ATTACHMENT FOR MOTOR VEHICLES
Filed March 6, 1925    4 Sheets-Sheet 4
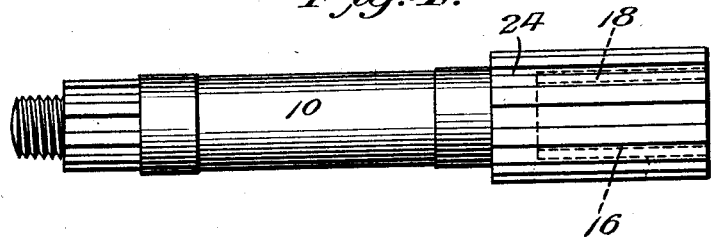
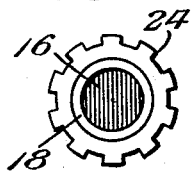
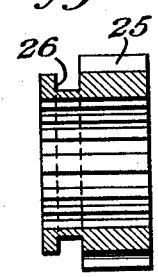
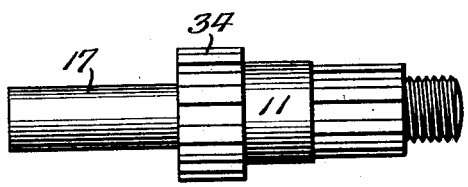
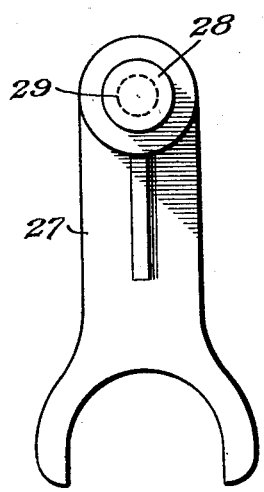
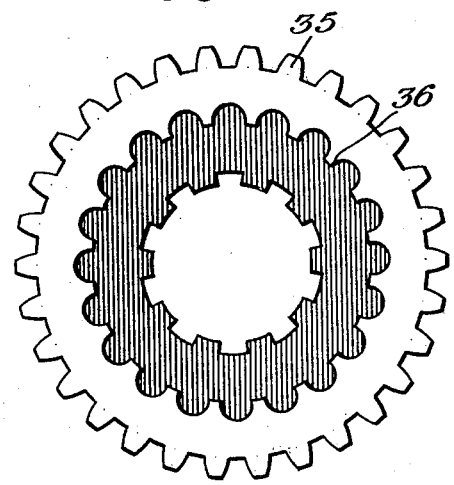

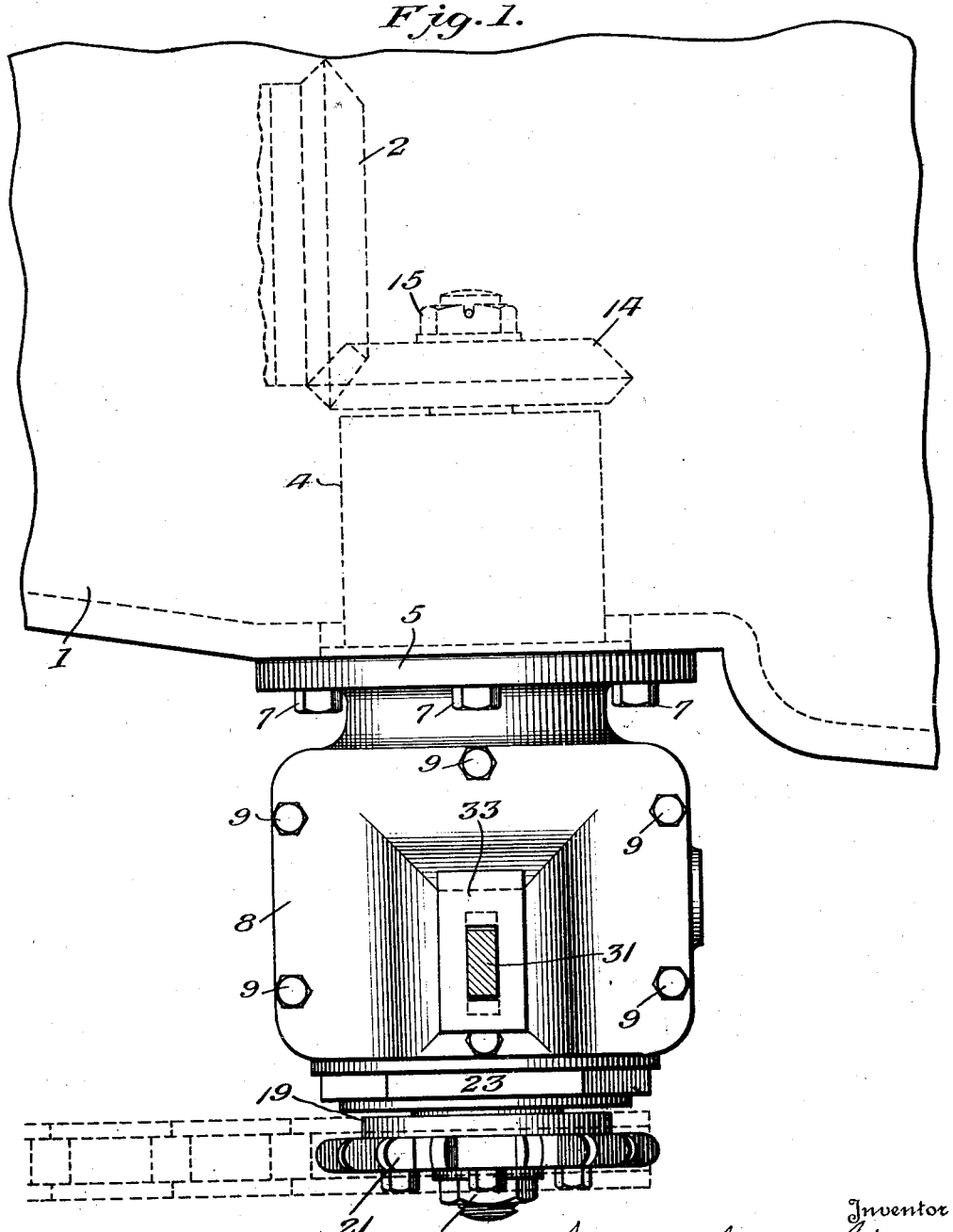

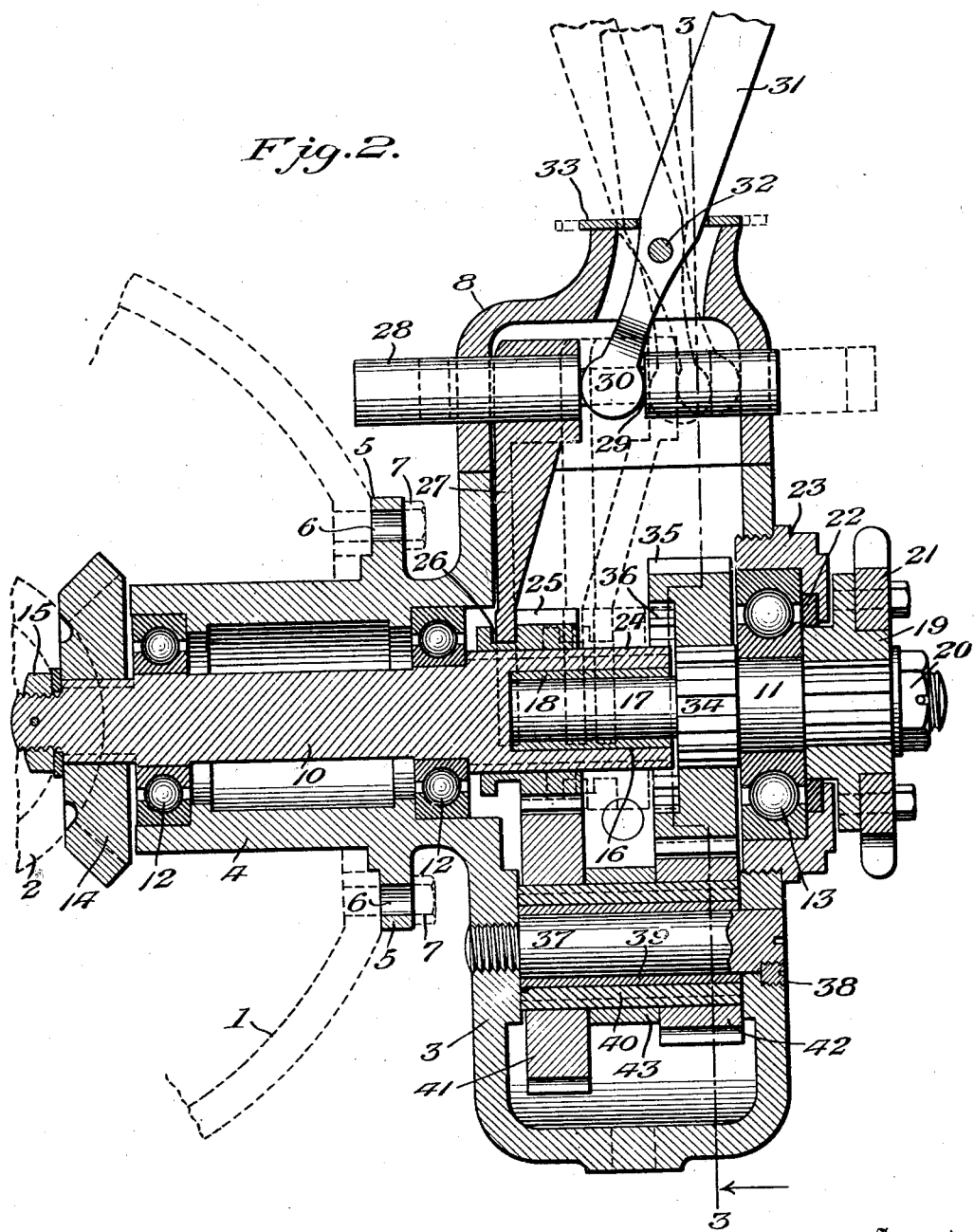

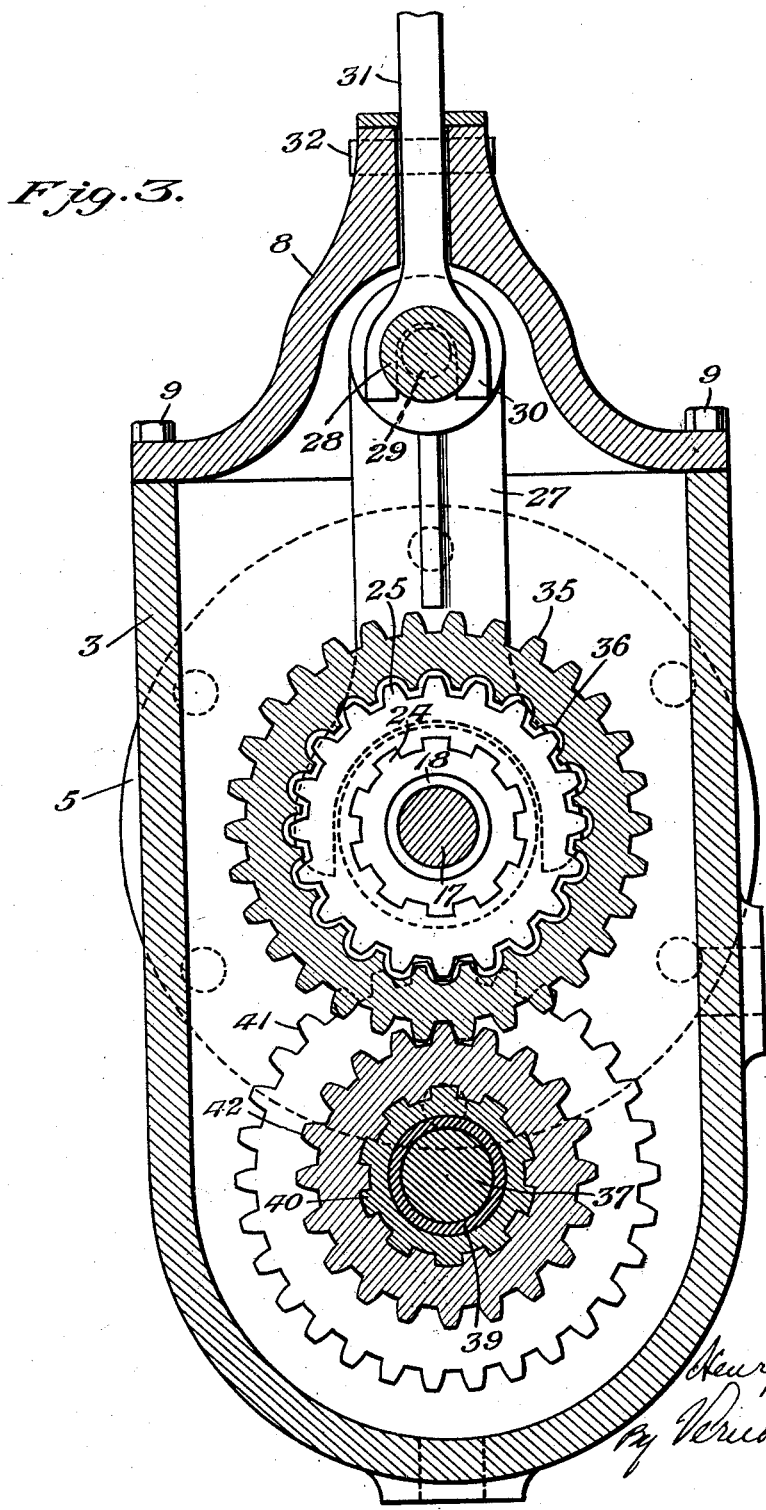

Patented Sept. 9, 1930

1,775,611

UNITED STATES PATENT OFFICE

HENRY H. WHITE, OF MUSKOGEE, OKLAHOMA; ROSE L. WHITE EXECUTRIX OF SAID HENRY H. WHITE, DECEASED

POWER-DELIVERING ATTACHMENT FOR MOTOR VEHICLES

Application filed March 6, 1925. Serial No. 13,498.

My invention relates to an improvement in power delivery attachments for motor vehicles.

The object of the invention is to provide a two speed power take-off completely assembled as a unit to be installed on a tractor, replacing the usual belt pulley attachment, and from which power can be transmitted by a chain, belt, or in any similar manner from the side of the tractor.

A further object of the invention is to provide a housing to be substituted for the belt pulley housing of the manufacturer, and to install in said housing a split axle held in position by ball bearings, and held together at the point where the two sections of the axle are separated by a tail bearing extending from one section into the other.

A still further object of the invention is to provide for the rotation of a belt pulley or sprocket mounted on the axle at substantially the same speed as the drive shaft of the tractor, from where the power is derived, and provision is also made for either reducing or increasing the speed of the sprocket or pulley, or to entirely disconnect the sprocket or pulley from the drive shaft permitting said pulley or sprocket to remain stationary.

The invention consists essentially in a one-piece housing which is bolted or otherwise secured to the side of the tractor, and has a cover which carries the shifting lever and fork. The housing has a sectional split axle journaled in bearings therein, which axle has a beveled gear fixed on the inner end thereof meshing with and being driven by a bevel gear on the main drive shaft of the tractor. The inner section of the axle has a sliding gear mounted thereon and the outer section of the axle has a fixed gear permanently secured thereto, and the sliding gear has a clutch engagement with the fixed gear for connecting the sections of the axle together and driving the belt pulley or sprocket at the same speed as the drive shaft or at high speed. Low speed is obtained by moving the sliding gear into mesh with a gear mounted in an auxiliary shaft, upon which is also secured a pinion meshing with the fixed gear. An intermediate position for the sliding gear is also provided, where said gear will permit the outer section of the axle to rest in a nonrotating position.

In the accompanying drawings:

Fig. 1 is a plan view of my invention as attached to a tractor;

Fig. 2 is a vertical section through the device;

Fig. 3 is a sectional view on the line 3—3 of Fig. 2;

Fig. 4 is a side elevation of the inner section of the axle;

Fig. 5 is an end view of the same;

Fig. 6 is a vertical section through the sliding gear;

Fig. 7 is an end view of the sliding shaft and fork;

Fig. 8 is a side elevation of the outer section of the axle, and Fig. 9 is a side elevation of the gear to be mounted on the outer section of the axle.

The numeral 1 represents the usual transmission gearing housing of a tractor having the usual drive shaft (not shown) therein, upon which shaft is mounted the drive shaft bevel gear 2.

A one-piece housing 3 is provided with an extension 4 projecting into the housing 1, and said extension 4 is provided with a circumferential flange 5 having holes 6 to receive bolts 7 for bolting the housing 3 to the transmission housing 1. A separate top or cover 8 is secured on the housing 3 by screws 9 for carrying the gear shift lever, as hereinafter described.

A split axle comprising inner and outer sections 10 and 11 is journaled in ball bearings 12 and 13 in the housing 3. The inner section 10 of the axle has a beveled pinion 14 splined to the inner end thereof which pinion meshes with the beveled pinion 2 mounted on the drive shaft of the tractor, and said pinion 14 is secured on the section 10 of the axle by lock nut 15. The inner section 10 is provided with a central bore 16 in the outer end thereof into which is fitted the extension 17 of the outer section 11 of the axle, forming a tail bearing between the two sections of the axle, a bushing 18 being inserted between the extension 17 and the bore 16. A bushing 19 is splined to the outer end of the outer section 11 of the axle and held thereon by a lock nut 20, and said bushing 19 has the drive sprocket 21 secured thereto. A felt dust ring 22 surrounds the bushing 19 adjacent the ball bearings 13 to exclude dust from the interior of the housing 3, and a collar 23 is screwed into the housing 3 to retain the ball bearing 13 and dust ring 22 in their respective positions.

The inner section 10 of the axle is provided with a splined section 24 upon which a gear 25 is slidable, said gear having a circumferential groove 26 which is engaged by the yoke 27 carried by the shaft 28 slidably mounted in the cover 8. The shaft 28 is provided with a groove 29 engaged by the forked end 30 of the shift lever 31 pivoted at 32 in the cover 8, and a slidable cover plate 33 fits around the lever 29 and rests on top of the cover 8.

The outer section 11 of the axle is provided with a splined section 34 upon which is fixed the gear 35 having an internal clutch gear 36, adapted to be slidably engaged by the gear 25.

Mounted in the lower portion of the housing 3 is a fixed shaft 37 held in position by a set screw 38. A bushing 39 is mounted on the shaft 37, and upon said bushing a rotatable sleeve 40 is fitted having the gears 41 and 42 splined thereto, said gears being spaced apart by a ring 43. The gear 42 meshes with the gear 35 and gear 41 is adapted to be meshed with and driven by the sliding gear 25.

From the foregoing description, the operation of the device will be apparent. As shown by full lines in Fig. 2, the sliding gear 25 transmits power to gear 41 and through sleeve 40, and gear 42 to gear 35 and outer section 11 of the axle for driving the sprocket 21 at low speed. The shifting lever 31 is moved to the left in Fig. 2 to the extreme dotted line position to move the sliding gear 25 into clutch engagement with the internal gear 36 for connecting the two sections of the axle together and driving the sprocket 21 at high speed. In the intermediate position the sliding gear 25 does not mesh with either of the gears 36 or 41, and the outer section 11 of the axle and the sprocket 21 remain in a stationary or non-rotating position.

It is obvious that by this arrangement more power can be secured from the tractor when used in low gear. This is especially desirable in oil field work, as, in pulling rods and tubing, the rods, necessarily being lighter, are pulled out when the power take off is operated at high speed, but the tubing with the fluid is heavier and requires more power, hence, by operating at low speed the tubing is removed until the load is lightened then the power take off is shifted into high and the remainder of the load is pulled out at high speed.

It is obvious that more or less slight changes might be made in the construction without departing from the general scope of the invention, therefore, I do not wish to be limited to the exact structure shown.

I claim:

1. A power delivering attachment for motor vehicles including a main housing having an opening in the side thereof, power delivering means within said main housing, a substantially one-piece auxiliary housing secured to said main housing exteriorly thereof and having an integral lateral projection extending into said main housing through the opening in the side thereof, said auxiliary housing having an opening in the outer side thereof, and having an open top, a cover for closing said open top, change speed gearing mounted within said auxiliary housing and connected with the power delivering means through the lateral extension, a drive shaft connected with said gearing and extending through the side opening in the auxiliary housing, a collar secured in the side opening of the auxiliary housing about the drive shaft, and bearings interposed between the collar and the drive shaft.

2. A power delivering attachment for motor vehicles including a housing having an opening in one side thereof, outer and inner sections of a drive shaft mounted in said housing, said outer section projecting through the opening, said inner section having an internal bore, an extension formed on the end of said outer section and projecting into the bore, a gear mounted on said outer section adjacent the end of the inner section and having internal clutch teeth, a pinion slidably mounted on the inner section in position to engage the clutch teeth, means for preventing the rotation of said pinion relative to the inner section, auxiliary means for transmitting the movement of said pinion to said gear, a collar screwed into the opening in the side of the housing and having an inwardly extending flange at the outer edge thereof, bearings interposed between the collar and the outer section of the shaft, a dust ring interposed between the bearings and the flange, and a drive bushing secured on the end of said outer section and projecting between the flange and dust ring and the outer section of the shaft.

3. A power delivering attachment for motor vehicles including a housing having an opening in a side thereof, outer and inner sections of a drive shaft mounted in said housing, said outer section projecting through the opening, gearing mounted within the housing, and forming a driving connection between the sections, a collar screwed into the opening in the side of the housing, and having an inwardly extending flange at the outer edge thereof, bearings interposed between the collar and the outer section of the shaft, a dust ring interposed between the bearings and the flange, and a drive bushing secured to the end of the outer section and projecting between the flange and dust-ring and the outer section of the shaft.

4. In a tractor the combination of an enclosing housing having an aperture therethrough, an auxiliary housing having inner and outer portions provided with a flange positioned adjacent said first-mentioned housing with the inner of the portions of said auxiliary housing projecting into said first-mentioned housing, fastening means passing through said flange and into said first-mentioned housing, a bearing carried by the inner end of said inner portion, a driving shaft carried in said bearing, the outer of said portions having a bearing at its outer end, a driven shaft carried in said last mentioned bearing, projecting inwardly and outwardly from said bearing, aligning with said driving shaft and having its inner end located closely adjacent the outer end of said driving shaft, a pulley carried by the outwardly projecting portion of said driven shaft closely adjacent said last mentioned bearing, and a slidable sleeve having splined connection with the adjacent ends of each shaft.

5. A power delivering attachment for motor vehicles including a main housing having an opening in the side thereof, power delivering means within said main housing, an auxiliary housing secured to said main housing and projecting into said main housing through the opening therein, change-speed gearing mounted within the auxiliary housing and connected with the power delivering means, the auxiliary housing having an orifice on the outer side thereof, and opposite the orifice in the main housing, and of a diameter greater than the largest wheel of the change speed gearing through which the parts within the auxiliary housing are assembled, and a collar adapted to close said orifice and having a bearing therein for the gearing.

6. A power delivering attachment for motor vehicles comprising an auxiliary housing adapted to be secured to a main housing and having at least a portion thereof projecting into said main housing through an opening therein, change speed gearing mounted within the auxiliary housing and adapted to be connected with the power delivering means of the motor vehicle, the auxiliary housing having an orifice on the outer side thereof, and opposite the orifice in the main housing, and of a size greater than the largest wheel of the change speed gearing through which the parts within the auxiliary housing are assembled, and means for closing said orifice and having a bearing therein for the gearing.

In testimony whereof I affix my signature.

HENRY H. WHITE.